United States Patent [19]

Demick

[11] Patent Number: 4,946,216

[45] Date of Patent: Aug. 7, 1990

[54] VEHICLE WITH INTEGRATED SEAT RISERS

[75] Inventor: Robert L. Demick, East Detroit, Mich.

[73] Assignee: Hoover Universal, Inc., Ann Arbor, Mich.

[21] Appl. No.: 413,956

[22] Filed: Sep. 28, 1989

[51] Int. Cl.⁵ .............................................. B60N 2/04
[52] U.S. Cl. ........................................ 296/63; 296/66; 297/15; 248/503.1
[58] Field of Search .................... 296/63, 64, 65.1, 66; 297/15; 248/503.1

[56] References Cited

U.S. PATENT DOCUMENTS

| | | | |
|---|---|---|---|
| 1,369,150 | 2/1921 | Welch | 296/63 X |
| 1,649,608 | 11/1927 | Matthews | 296/65.1 |
| 2,799,321 | 7/1957 | Liljengren et al. | 296/64 |
| 4,708,387 | 11/1987 | Yamano et al. | 296/63 |

FOREIGN PATENT DOCUMENTS 360102 4/1921 Fed. Rep. of Germany.

Primary Examiner—Margaret A. Focarino
Assistant Examiner—Gary C. Hoge
Attorney, Agent, or Firm—Harness, Dickey & Pierce

[57] ABSTRACT

A seat riser integrated with the floor or bed of an automotive vehicle having a removable seat. The integration reduces the height and weight of the seat assembly and allows for the easier use of the vehicle in its full capacity. The seat riser is capable of rotating from a generally vertical operative position to a generally horizontal inoperative position. When in the inoperative position, the seat riser is concealed within a recessed well and has a top portion lying flush with the floor or bed of the vehicle. After rotation, the seat riser is locked into the operative position by a pin and hole locking mechanism. A removable seat, equipped with complimentary retaining elements, is then positioned on the seat risers. Two arms of a spring biased retaining mechanism are then able to engage the retaining elements of the removable seat. The seat riser thus secures and supports the seat in the interior of the vehicle.

15 Claims, 4 Drawing Sheets

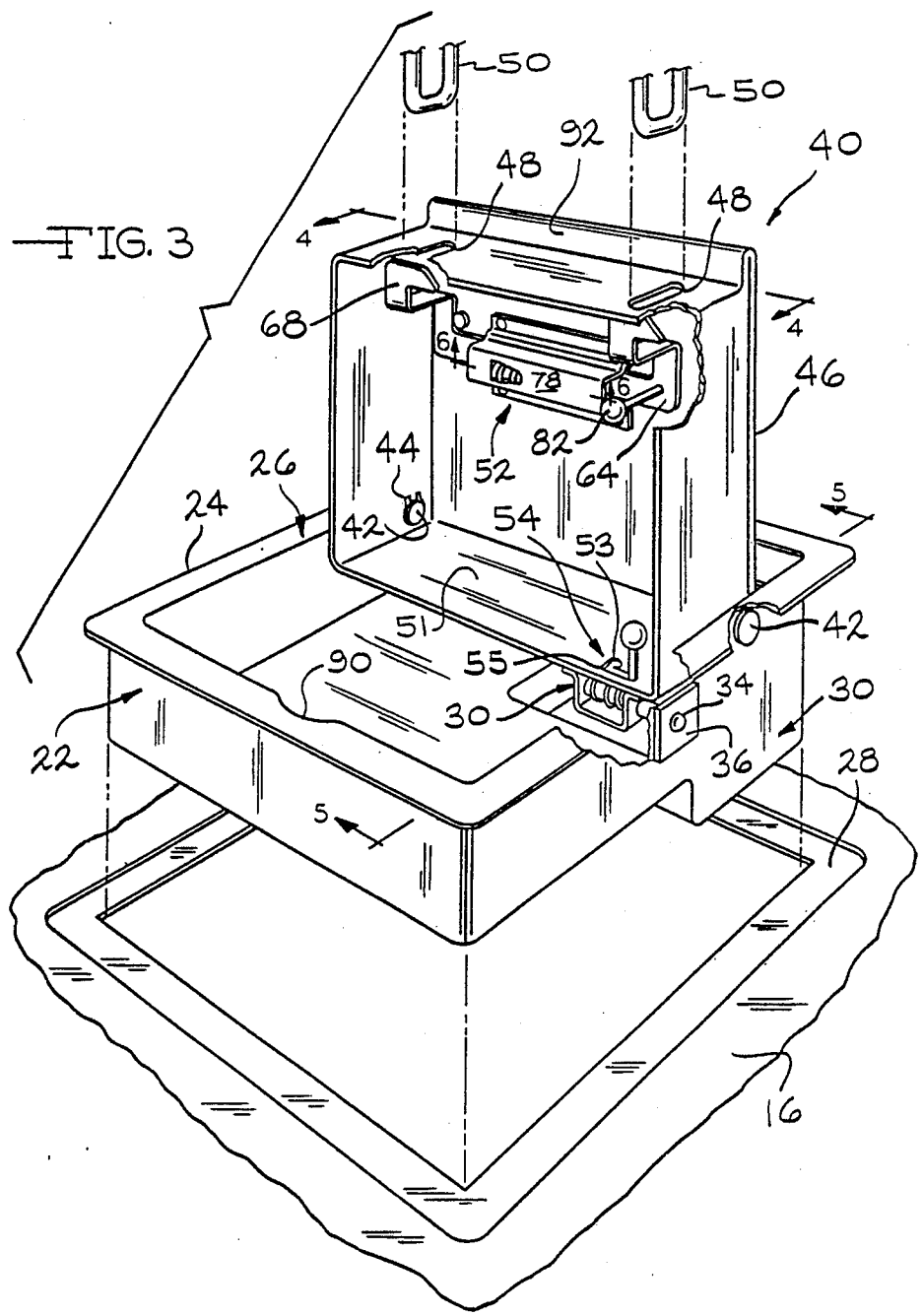

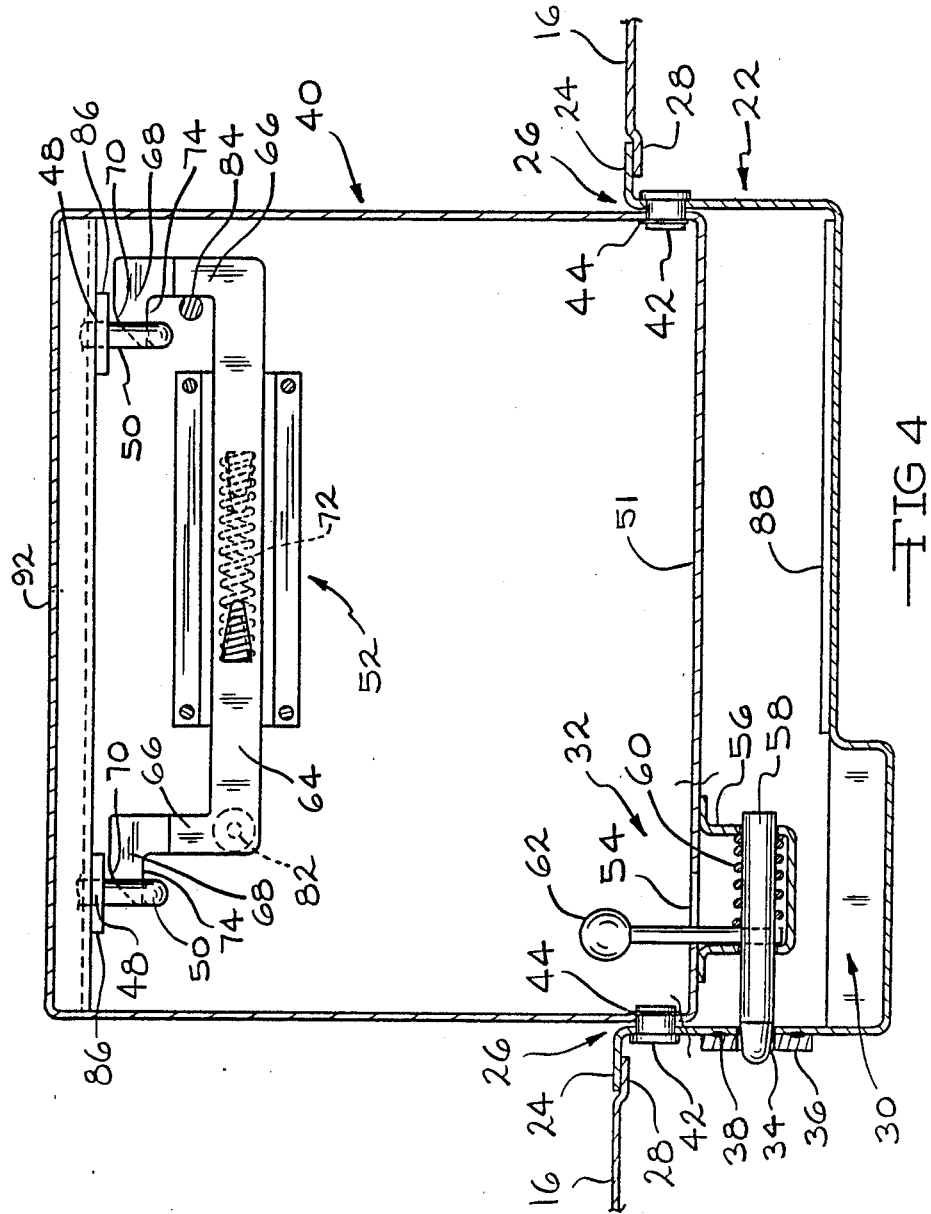

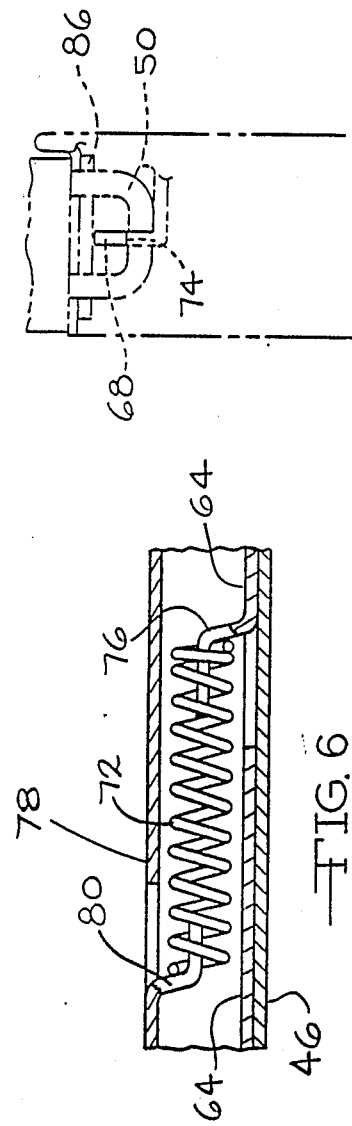
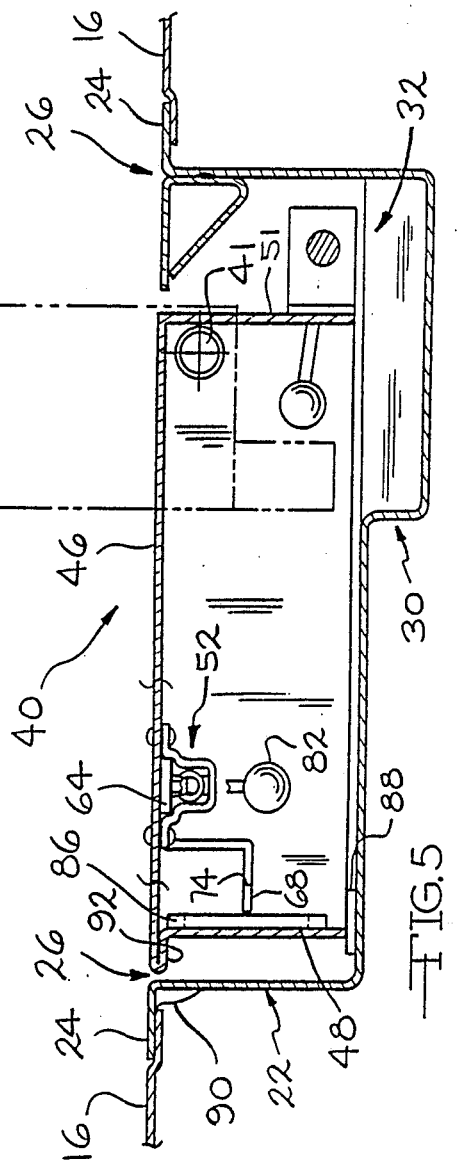

VEHICLE WITH INTEGRATED SEAT RISERS

BACKGROUND OF THE INVENTION

The invention relates to an automotive vehicle having a removable seat wholly supported by integrated seat risers. More particularly, the invention relates to an automotive vehicle having at least one pair of integrated seat risers mounted in the floor or bed of the vehicle. The seat risers lie flush and concealed with the vehicle floor when in an inoperative position and extend upwardly when in an operative position. To facilitate an easier installation and removal of the vehicle seat, the seat risers are capable of being locked into the operative position. Also in order to increase installation ease, the seat risers are substantially capable of self-engagement with an appropriately equipped seat assembly.

More large automotive vehicles, including station wagons, vans, passenger trucks, utility and recreation vehicles, are purchased for their carrying capacity. This carrying capacity includes not only the transportation of passengers, but also the transportation of various sizes and amounts of cargo. For this reason, most, if not all, of these vehicles come with some type of removable or stow-away seat.

Typically, the removable seat assemblies of these vehicles are of the self-standing type. Accordingly, each seat assembly has its own set of frame mounted legs or risers. Once the seat assembly is positioned inside the vehicle, the frame mounted risers are bolted or latched to the floor of the vehicle.

The frame mounted risers do not interfere with either the driver or the passengers once secured in the vehicle. The same is true once the seat assembly is removed from the vehicle. However, during the installation and subsequent removal of the seat assembly, frame mounted risers have demonstrated several limitations. The two most significant of these limitations being size and weight.

Typically, frame mounted risers have a height variance of eight to fourteen inches. The increased seat height is advantageous in that it promotes passenger comfort and visibility. However, this increase in assembly height displays disadvantages, predominantly during the installation and removal of the seat assembly in the limited confines of the vehicle's cargo area. The list of casualties from the protruding frame mounted risers includes scratched and marked up floors, doors, door wells and sometimes even the legs of the person handling the assembly.

A second limitation of frame mounted riser is the resulting weight increase to the seat assembly itself. During the installation or removal of a seat assembly, the person performing the function must do so while in a bent over position. This is again because of the limited confines of the vehicle's cargo area. Any increase in weight thus compounds the difficulty of installation and removal. Conversely, any decrease in seat assembly weight aids the installation or removal procedure.

Prior art has shown vehicle seat support members being mounted in the floor of a vehicle and being movable between a flush position and an upright position. One such example in U.S. Pat. No. 251,737. The aforementioned patent shows risers D movable between a concealed position in FIG. 1 and an upright position, in FIG. 2, where the risers support a portion of a vehicle seat folded out to form a bed. Unlike the present invention, the risers of the previously mentioned patent do not support the entire seat assembly.

Similarly, U.S. Pat. No. 4,784,425 discloses a riser type member 44 being movable between a concealed position and an upwardly extending seat locking position. However, no disclosure is made of using a rotatably mounted frame supported riser for facilitating the full use of a vehicle having a removable seat. Rather, the purpose of member 44 is to lock a rotatable coach train seat in the rotated position.

It is the object of the present invention to eliminate both the height and weight limitations of removable vehicle seat assemblies having frame mounted seat risers. It is another object of the present invention to encourage the full utilization of the vehicle.

Once the seat assembly is removed, the riser of the present invention lies flush and concealed with the bed or floor of the vehicle's cargo area. This is the inoperative position of the riser. From the inoperative position, the riser of the present invention is capable of pivoting about one axis and locking in an upwardly extending position. This is the operatively position of the riser.

With the risers in the operative position, a seat assembly need only be manipulated into the vehicle's cargo area and positioned on the risers. The present invention is designed so that a seat assembly, having corresponding engagement elements, will be able to substantially self-engage the risers through guide slots in the upper surface of the risers. To facilitate engagement, one positions the seat assembly's engagement elements over the appropriate guide slots and pushes down on the seat assembly. Once engaged, the seat assembly is entirely supported by and through the risers.

Disengagement of the seat assembly from the risers is also accomplished in two steps. First, sliding a spring biased engagement member backwards disengaging the arms thereof and second, lifting the seat assembly and engagement elements out of the riser slots.

With the incorporation of the seat risers into the vehicle floor, the overall seat assembly is considerably reduced in height and weight.

With these subsequent reductions in height and weight, the seat assembly is more easily moved and manipulated during installation and removal. The ease in which one can readily install and remove the seat assembly thus further encourages an operator to use the vehicle to its fullest extent.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 3 is a generally exploded perspective view of a seat riser constructed according to one embodiment of the present invention.

FIG. 4 is a sectional view generally taken along lines 4—4 in FIG. 3 of the seat riser of the present invention including a sectional view of the locking mechanism.

FIG. 5 is a sectional view generally taken along lines 5—5 of FIG. 3 of a seat riser in the inoperative position and also showing a transverse sectional view of the seat retaining mechanism and a phantom view of the seat riser in the operative position for clarity.

FIG. 6 is a section view taken generally along line 6—6 in FIG. 3 of the spring member of the seat retaining mechanism of the present invention.

DETAILED DESCRIPTION OF THE INVENTION

Figure 1:
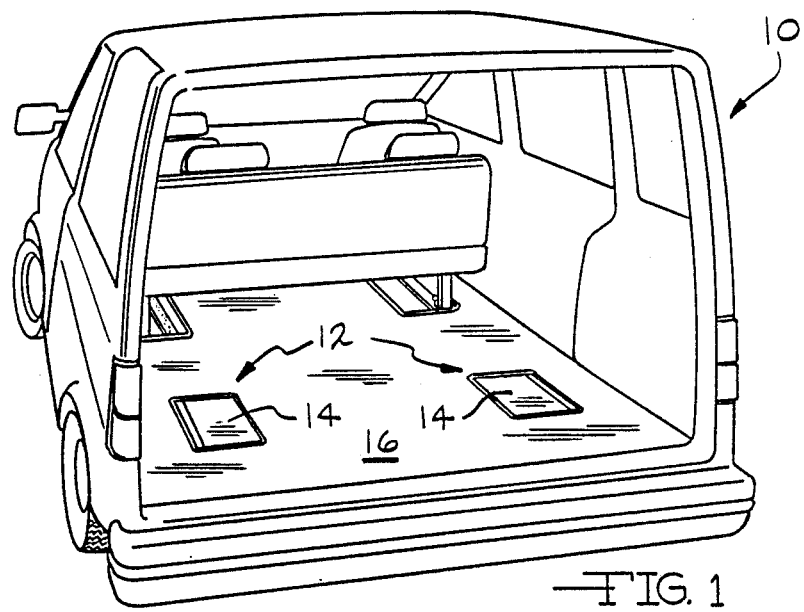
FIG. 1 is a perspective view of an automotive vehicle, with its rear door removed, incorporating and showing the seat risers of the present invention in the inoperative position.

Now with reference to the drawings, FIG. 1 shows an automotive utility vehicle 10, in particular a van, with its rear door removed and incorporating seat risers 12 according to the principals of the present invention. When in an inoperative position 14, the seat riser 12 lies flush and concealed with a floor 16 or bed of the vehicle 10. While the drawings depict the seat risers of the present invention being incorporated into the floor of a van, the invention is easily applied other vehicles having removable seats. The invention may also be applied outside the automotive industry in circumstances requiring the periodic positioning of seats on some type of platform.

Figure 2:
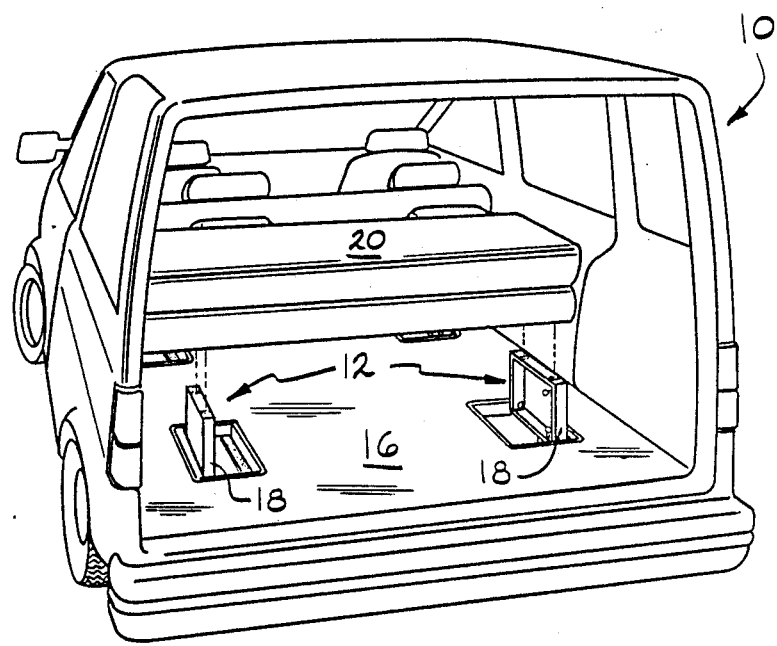
FIG. 2 is a perspective view of the vehicle of FIG. 1 showing a seat assembly in exploded view from the seat risers of the present invention in their operational position.

The seat riser 12 is pivotally mounted in the floor 16 of the vehicle 10 so as to enable the seat riser 12 to rotate upwardly into a generally vertical operative position 18, as seen in FIG. 2. When in the operative position 18, the seat riser 12 readily engages a correspondingly equipped removable seat assembly 20.

FIG. 3 generally displays a seat riser 12 in the operative position 18 according to one embodiment of the present invention. The floor 16 of the vehicle 10 is designed so as to accept a recessed well 22. The recessed well 22 has a flanged lip portion 24 along its upper rim 26. The lip portion 24 nests in a correspondingly recessed portion 28 of the floor 16 so that the lip portion 24 will lie flush with the floor 16. The lip portion 24 and the recessed portion 28 of floor 16 can be attached to one another by various methods, one possible method being welding. In another embodiment of the present invention, the recessed well 22 may be integrally formed from the floor 16 and therefore no attachment between the recessed well 22 and the floor 16 is necessary.

The recessed well 22 also contains a smaller, secondary well 30. During rotation of the seat riser 12 from the inoperative position 14 to the operative position 18, this secondary well 30 provides the clearance needed for a locking mechanism 32 mounted as in the present embodiment of the invention.

The recessed well 22 also has a wall portion defining a receiving hole 34 located near the secondary well 30. A reinforcement plate 36 is mounted exteriorly of the receiving hole 34. As mounted, the reinforcement plate 36 further defines the receiving hole 34. The reinforcement plate 36 can be integrally formed with a wall of the recessed well 22 or it can be secured by welds 38 as shown in FIG. 4.

A generally box shaped housing structure 40 is pivotally attached to one end of the recessed well 22 by pivot pins 42. The pivot pins 42 are each secured in position by snap rings 44 on the interior side of the housing structure 40. Being so attached, the entire housing structure 40 is capable of rotating about its pivotal axis 41 from the horizontal inoperative position 14 to the vertical operative position 18.

The housing structure 40, while being generally box shaped, has one open wall. When in the inoperative position 14, the open wall is located on the bottom of the housing structure 40, as seen in FIG. 5. Also when in the inoperative position 14, the top wall 46 of the housing structure 40 lies flush with the floor 16 as mentioned earlier. The top wall 46 (hereinafter "flush wall") corresponds with both the floor 16 and the lip portion 24 of the recessed well 22 to give the seat riser 12 its concealed appearance. If the floor 16 of the vehicle 10 is covered with a mat or carpeting, the flush wall 46 may also be covered with that material to further aid in the concealment of the seat riser 12.

When the seat riser 12 is in the operative position 18, a portion of the uppermost wall of the housing structure 40 defines two guide slots 48. The guide slots 48 direct corresponding retaining elements 50 of the seat assembly 20 into engagement with a retaining mechanism 52 mounted internally of housing structure 40. Also when the seat riser 12 is in the operative position 18, a portion of the lowermost wall 51 of the housing structure 40 defines a generally hook shaped slot 54.

Once vertical, the seat riser 12 is capable of locking into the operative position 18. This is accomplished by the employment of the locking mechanism 32 previously mentioned.

When the seat riser 12 of the preferred embodiment is in the operative position 18, the locking mechanism 32 is attached exteriorly of the lowermost wall 51 of the housing structure 40. The locking mechanism 32 is positioned so as to be above the secondary well 30, thus granting the additional clearance required for the shown embodiment of the seat riser 12. The attachment structure 56 of the locking mechanism 32 may be secured to the lowermost wall 51 of the housing structure 40 by seam welding, spot welding, or various other attachment methods. The locking mechanism 32 is also positioned so as to allow the insertion of a locking pin 58 into the receiving hole 34 of the recessed well 22. A spring member 60 is positioned and biased so as to encourage the insertion of the locking pin 58 into the receiving hole 34.

While the spring member 60 encourages the insertion of the locking pin 58 into the receiving hole 34, the locking mechanism 32 is also capable of continual disengagement between the locking pin 58 and the receiving hole 34. This is accomplished, in part, by the attachment of a radially extending handle 62 to the locking pin 58. The handle 62 is positioned on the locking pin 58 so as to extend interiorly of the housing structure 40 through the slot 54 located in the lowermost wall 51 of the housing structure 40. The slot 54 is oriented so that a hook portion 53 is located most interiorly. By sliding the handle 62 along a shank portion 55 of the slot 54 and into the hook portion 53, the biasing of the spring member 60 will cause the continual disengagement of the locking pin 58 from the receiving hole 34.

The retaining mechanism 52 is mounted along the interior surface of the flush wall 46 of the housing structure 40. The retaining mechanism 52 is designed so as to substantially allow self-engagement of the retaining elements 50 of the seat assembly 20 with a retaining finger 68 of a retaining member 64.

The retaining member 64 of the retaining mechanism 52 extends in a generally horizontal direction parallel to the interior surface of the flush wall 46 of the housing structure 40. At each end of the retaining member 64 an arm 66 extends upwardly. The arms 66 also extend in a lateral direction, approximately at the mid-point of their vertical extension. Both arms 66 terminate in a generally horizontally extending retaining finger 68. Each retaining finger 68 has a downwardly sloping leading edge 70 to promote engagement with the retaining elements 50 of the seat assembly 20.

The retaining member 64 is biased by a second spring member 72 toward the downward sloping leading edge 70 of the retaining fingers 68. When the retaining elements 50 of the seat assembly 20 are extended through the guide slots 48 during installation of the seat assembly 20, the retaining elements 50 come into contact with the downwardly sloping leading edges 70 of the retaining fingers 68 and force the retaining member 64 to move against the biasing of the second spring member 72. Once the retaining elements 50 are fully inserted, the second spring member 72 advances the retaining member 64 in its biased direction and thus engages the retaining fingers 68 with the retaining elements 50. While the generally downward sloping leading edges 70 of the retaining fingers 68 encourage engagement with the retaining elements 50, the generally horizontal lower edges 74 of each retaining finger 68 discourage any disengagement.

The second spring member 72 is attached to the retaining member 64 by a generally triangular shaped tongue 76. The tongue 76 is positioned interiorly of one end of the second spring member 72 and is integrally stamped from the body of the retaining member 64. At its opposite end, the second spring member 72 is attached to a cover 78 by a second tongue 80. The second tongue 80 is stamped integrally from the body of the cover 78 and extends interiorly of the other end of the second spring member 72.

One function of the cover 78, as mentioned earlier, is a point of attachment for one end of the second spring member 72. A second function of the cover 78 is safety in that it limits the exposure of the second spring member 72 and thus prevents the accidental pinching of an operator's fingers in the second spring member 72. The third function of the cover 78, and probably the most important, is the attachment of the entire retaining mechanism 52 to the interior surface of the flush wall 46 of the housing structure 40.

A disengagement handle 82 is positioned on the retaining member 64 to enable the disengagement of the retaining fingers 68 from the retaining elements 50 of the seat assembly 20. Using the disengagement handle 82, the retaining member 64 is moved against its biasing. Once the lower edge 74 of each retaining finger 68 is no longer in engagement with a retaining element 50, the seat assembly 20 is lifted from the seat riser 12 and the retaining elements 50 exit the guide slots 48.

A stop pin 84 is provided along the interior of the flush wall 46 to limit the movement of the retaining member 64 when the retaining elements 50 are disengaged from the seat riser 12. The addition of the stop pin 84 permits the second spring member 72 to be attached to both the retaining member 64 and the cover 78 through only the biasing of the second spring member 72 itself. Thus attached, the second spring member 72 is incapable of full extension.

Located beneath each guide slot 48 is a load distribution plate 86, which, as its name implies, helps to distribute the load of the seat assembly 20 evenly to the pivot pins 42. The load distribution plates 86 further define the guide slots 48 and can be attached to the housing structure 40 by the various means mentioned earlier with regard to the reinforcement plate 36.

When in the inoperative position 14, the seat riser 12 does not lock into position. Rather, by weight and center of gravity of the seat riser 12 allow the seat riser 12 to remain substantially in the horizontal inoperative position 14. A rubber strip 88 is positioned along the bottom of the recessed well 22 so as to contact the lowermost edge of the housing structure 40 when the seat riser 12 is in the inoperative position 14. The rubber strip 88 reduces any excessive noise produced by the seat riser 12 while traveling in the inoperative position 14.

The recessed well 22 also provides a finger opening 90. The finger opening 90 permits the insertion of the operator's finger to engage a lifting lip 92 and rotate the seat riser 12 from the inoperative position 14 to the operative position 18. The finger opening 90 and lifting lip 92 are best seen in FIG. 3 and FIG. 5.

While the above description constitutes the preferred embodiments of the present invention, it will be appreciated that the invention is susceptible to modification, variation and change without departing from the proper scope and fair meaning of the accompanying claims.

I claim:

1. In a vehicle having a floor and a removable unitary seat member including a cushion portion and a back portion mounted on the rear edge of said cushion portion, a pair of seat risers, each said seat riser comprising:
   a generally box shaped support structure being pivotally attached to said floor enabling said support structure to rotate between a generally concealed horizontal position and a generally vertical position, said support structure also having one wall corresponding to and being flush with said floor of said vehicle when in said horizontal position;
   means for locking said support structure in said vertical position; and
   means on said support structure for engaging said removable seat when said support structure is in said vertical position.

2. A seat riser as set forth in claim 1 wherein said locking means includes a locking pin, a biasing member, a portion of said floor defining a receiving hole, said biasing member urging insertion of said locking pin into said receiving hole, and means for disengaging said locking pin from said receiving hole.

3. A seat riser as set forth in claim 2 wherein said disengagement means includes a handle extending radially from said locking pin, a portion defining a generally hooked shaped slot, said slot for receiving and maintaining said handle in a disengaged position while said support structure is in said horizontal position.

4. A seat riser as set forth in claim 1 wherein said engagement means includes a retaining member and a biasing member.

5. A seat riser as set forth in claim 4 wherein said biasing member is a spring, one end of said spring being attached to said support structure and an opposite end being attached to said retaining member, said retaining spring biasing said retaining member into engagement with a corresponding retaining element of said removable seat.

6. A seat riser as set forth in claim 4 wherein said engagement means further includes a disengagement handle and a stop pin, said disengagement handle enabling the disengagement of said retaining member from a corresponding retaining element, said stop pin limiting the movement of said retaining member when said retaining member is not engaged with a corresponding retaining element.

7. A concealable seat riser for integration in the floor of an automotive vehicle having a removable seat, said seat riser comprising:
   a generally shoe box shaped housing, said housing being rotatably attached to said floor to allow said housing to rotate from a generally vertical position to a generally horizontal position, said housing being concealed inside of said floor and having one wall flush with said floor when in said horizontal position;
   means for locking said housing in said vertical position, said locking means being attached exteriorly to a lower wall of said housing when said housing is in said vertical position; and
   means for engaging said removable seat, said engagement means being attached to an interior surface of said flush wall of said housing.

8. A concealable seat riser as set forth in claim 7 wherein said locking means includes a horizontally mounted locking pin, a portion of said floor defining a receiving hole, a biasing member for urging insertion of said locking pin into said receiving hole, a portion of said lower wall of said housing defining a generally checkmark shaped slot, said handle extending internally of said housing through said checkmark shaped slot, said locking pin having a radially extending handle, said checkmark shaped slot enabling the continual disengagement of said locking pin from said receiving hole while said housing is in said horizontal position.

9. A concealable seat riser as set forth in claim 7 wherein said engagement means includes a generally horizontal engagement member, said engagement member having at least one upwardly extending vertical arm, said arm also extending laterally, said arm terminating in a generally horizontal finger portion, said finger portion having a downwardly sloping leading edge for encouraging engagement of said arm with a corresponding engagement element of said removable seat, said engagement means also including a retaining spring, a spring housing, said retaining spring being attached at one end to said engagement member and being attached at an opposite end to said spring housing, said retaining spring biasing said engagement member into engagement with said corresponding engagement element of said removable seat, said engagement member also having a laterally extending handle, said handle enabling said engagement member to be slidably moved against said bias of said retaining spring.

10. A concealable seat riser as set forth in claim 9 wherein said engagement member has two upwardly extending vertical arms, said arms extending from opposite ends of said engagement member.

11. In the floor of a automotive vehicle having at least one removable seat, a seat riser comprising:
   a generally rectangular housing, said housing being pivotally attached and mounted in said floor, said housing also being rotatable about a pivotal axis from a generally horizontal position to a generally vertical position, said housing rotating transversely to a longitudinal axis of said vehicle, said housing being concealed and flush with said floor of said vehicle when in said horizontal position, said housing having one open wall, said open wall being downward when said housing is in said horizontal position, said housing also having portions defining guide slots, said guide slots being located in a top wall of said housing when said housing is in said vertical position;
   means for locking said housing in said vertical position, said locking means including a generally horizontal locking pin, a spring member, a portion of said floor defining a receiving hole, said spring member biasing said locking pin toward insertion into said receiving hole, a locking handle, a portion of said housing defining a locking slot, said handle and said locking slot and said spring member coacting to cause continual disengagement of said locking pin from said receiving hole when said housing is in said horizontal position; and
   means for retaining said removable seat, said retaining means including a generally horizontal retaining member, said retaining member having two arms extending vertically upward from opposite ends thereof, said arms ending in generally horizontal fingers, said fingers being positioned immediately beneath said guide slots, a retaining spring biasing said fingers into engagement with corresponding retaining elements of said removable seat, said retaining member also having a disengagement handle enabling the disengagement of said fingers from said corresponding retaining elements of said removable seat.

12. A seat riser mounted in the floor of a automotive vehicle as set forth in claim 11 wherein said locking means being attached exteriorly to lower wall of said housing when said housing is in said vertical position.

13. A seat riser mounted in the floor of a automotive vehicle as set forth in claim 11 wherein said arms also have laterally extending portions.

14. A seat riser mounted in the floor of a automotive vehicle as set forth in claim 11 wherein said fingers also have downwardly sloped leading edges, said leading edges allowing for substantial self-engagement of said fingers with said corresponding retaining elements of said removable seat.

15. A seat riser mounted in the floor of a automotive vehicle as set forth in claim 11 wherein said retaining means also includes a stop pin, said stop pin limiting the movement of said returning member when said retaining member is not engaged with said corresponding retaining elements of said removable seat.

* * * * *